(12) United States Patent  (10) Patent No.: US 8,184,003 B1
Nichols  (45) Date of Patent: May 22, 2012

(54) MOTION DETECTION AND LOCATING APPARATUS AND METHOD

(76) Inventor: Frank R. Nichols, Oceanside, CA (US)

( * ) Notice: Subject to any disclaimer, the term of this patent is extended or adjusted under 35 U.S.C. 154(b) by 343 days.

(21) Appl. No.: 12/191,878

(22) Filed: Aug. 14, 2008

Related U.S. Application Data

(60) Provisional application No. 60/955,687, filed on Aug. 14, 2007.

(51) Int. Cl.
*G08B 13/00* (2006.01)
(52) U.S. Cl. ......... 340/541; 340/565; 348/155; 348/152
(58) Field of Classification Search .................. 340/541, 340/565; 348/155, 152
See application file for complete search history.

(56) References Cited

U.S. PATENT DOCUMENTS

| | | | | |
|---|---|---|---|---|
| 4,745,284 A * | 5/1988 | Masuda et al. | ............. | 250/338.3 |
| 6,163,025 A | 12/2000 | Pantus | | |
| 6,215,399 B1 * | 4/2001 | Shpater | ......................... | 340/567 |
| 6,323,488 B1 * | 11/2001 | McCavit et al. | ............... | 250/347 |
| 6,697,103 B1 * | 2/2004 | Fernandez et al. | ............. | 348/143 |
| 7,053,374 B2 | 5/2006 | Barone | | |
| 7,183,912 B2 * | 2/2007 | Micko | ......................... | 340/545.3 |
| 7,250,605 B2 * | 7/2007 | Zhevelev et al. | ................ | 250/353 |
| 2005/0185053 A1 * | 8/2005 | Berkey et al. | ................. | 348/155 |
| 2007/0018106 A1 * | 1/2007 | Zhevelev et al. | ............. | 250/353 |

* cited by examiner

*Primary Examiner* — Travis Hunnings
(74) *Attorney, Agent, or Firm* — Plager Schack LLP

(57) ABSTRACT

A motion detecting apparatus and method which comprises a plurality of area-sensors each generating or modifying an electrical signal in response to a stimulus, and thereafter monitoring the signal to locate the object and its relative position, moment to moment.

8 Claims, 7 Drawing Sheets

Figure 1 – Prior Art US 4,745,284
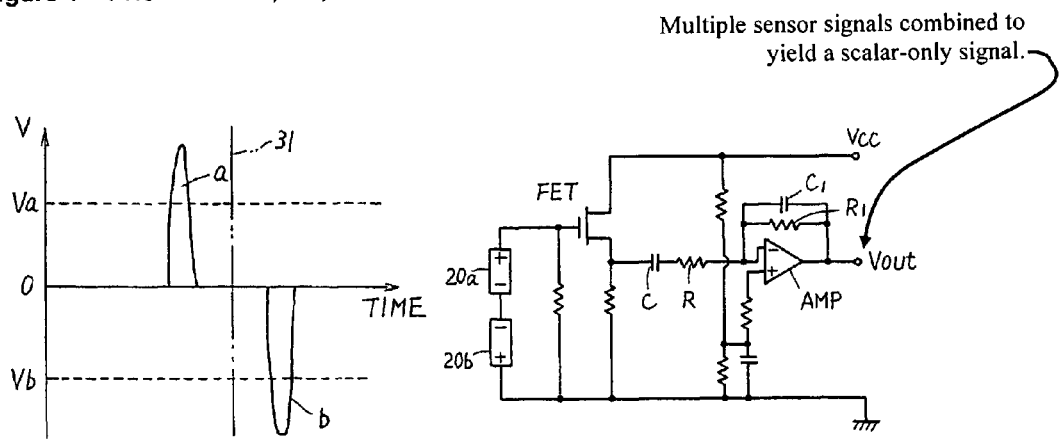
Multiple sensor signals combined to yield a scalar-only signal.
Figure 2 – Prior Art US 7,183,912
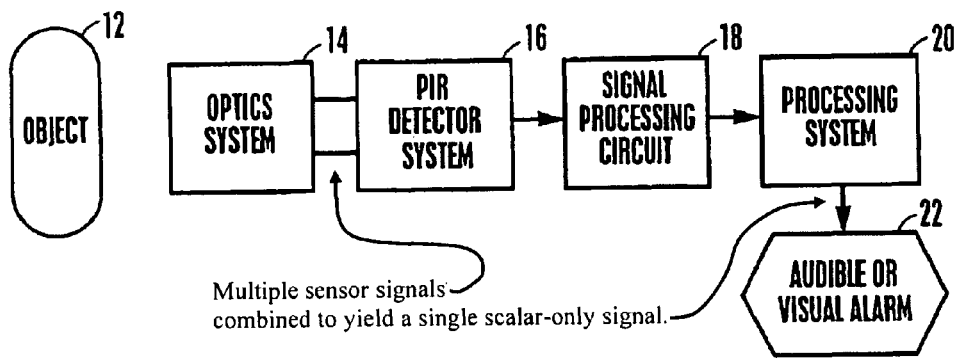
Multiple sensor signals combined to yield a single scalar-only signal.

Figure 3 – Prior Art US 6,215,399
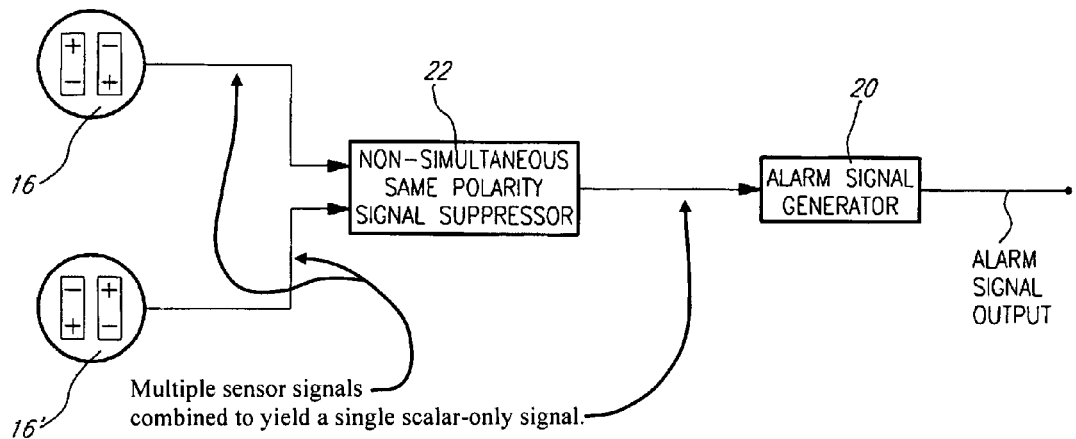
Multiple sensor signals combined to yield a single scalar-only signal.
Figure 4
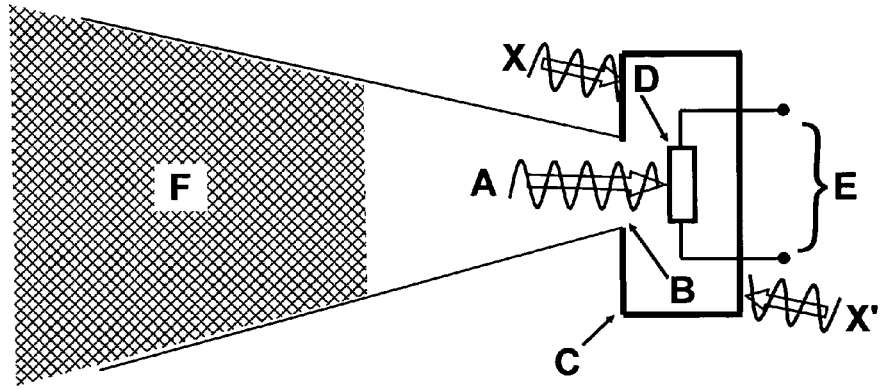

MOTION DETECTION AND LOCATING APPARATUS AND METHOD

PRIORITY

Applicant claims the benefit of U.S. Provisional Patent Application No. 60/955,687 filed Aug. 14, 2007.

FIELD OF THE INVENTION

The present invention relates to the field of motion detection and measurement. Specifically, identifying the location of the moving object being detected, based upon the extraction of vectorial information from electrical signals present in motion detection circuitry.

BACKGROUND

Motion detectors are commonly used in security and other applications to detect the presence or absence of motion, and to use the information thus derived to, for example, trigger alarms or turn on lights. The simplicity and inexpensiveness of such detectors has led to their ubiquity in both industrial and domestic contexts.

Although ordinary light is sometimes used, typically such motion detectors use passive infrared sensors to sense the presence of people and animals or other sources of infrared radiation. The common component shared among all such motion detectors is the area-sensor, defined as a means of converting energy coming from a particular direction into an electrical signal, as depicted in FIG. 4.

Many patents have been issued wherein multiple area-sensors are employed. In every case, however, what is claimed in the prior art are improved methods for avoiding 'false alarms', e.g., accidental activation due to abrupt changes in room temperature, the motion of pets, light from the headlamps of passing cars, etc. The manner in which these devices of the prior art treat signals from their respective area-sensors teaches against the present invention.

U.S. Pat. No. 4,745,284, discloses an infrared detector that includes two pyroelectric infrared ray detecting elements electrically connected with each other to generate an output signal corresponding to the difference between them. This patent, as depicted in FIG. 1, teaches the deliberate destruction of the vectorial information by developing a scalar-only resultant signal.

U.S. Pat. No. 7,183,912, discloses a passive infrared sensor with a plurality of detector elements that detects objects by comparing the frequency of the 'sum' of the signals to the frequency of the 'difference'. This prior art explicitly teaches the destruction of vectorial information as shown in FIG. 2, by combining signals from multiple area-sensors into a simple ON or OFF state for an "audible or visual alarm".

U.S. Pat. No. 6,215,399, discloses a motion detector that monitors multiple "zones", or areas of detection, such that when multiple "zones" generate simultaneous signals it indicates that the object is "big enough" to be a person, rather than a pet. This patent, as depicted in FIG. 3, explicitly teaches the destruction of vectorial information through the use of a "suppressor" circuit shown as element 22 in the figure.

In each case, motion detectors provide only an indication of the presence or absence of a moving object. Simple motion detection does not suffice for many applications where it is desirable to ascertain not simply whether an object is in the relevant area, but where within that area the object is located. Localizing objects, as opposed to simply detecting their presence or absence, currently requires considerably more sophisticated, and therefore expensive, electronics, optics, and substantial computing power. For example, as disclosed in U.S. Pat. No. 6,088,468, objects have been localized electronically by comparing two video images or pictures, pixel by pixel, to determine the position and movement of an object, an effective but expensive solution, often requiring extensive and specialized wiring, a separate "computer" with sophisticated software, and substantial amounts of electric power. Such devices are also prohibitively expensive for everyday household or small office use.

A need therefore exists for a simple, inexpensive apparatus and method that can be used to detect not only the presence but the location of objects, and that can be easily installed and cheaply replaced, if necessary.

Localizing an object has further advantages. e.g. a typical alarm system or lighting system turns OFF after a preset interval, even though an intruder or the object of interest remains in the area. The present invention remedies this shortcoming as the object, having been localized, is 'known' to remain within the detection area, even though it has stopped moving.

SUMMARY OF THE INVENTION

The present invention provides a motion detection and locating apparatus and method that uses a plurality of area-sensors, where each area-sensor comprises an inexpensive energy-detector and means of restricting the energy falling upon the detector to that arriving from a particular direction as depicted in FIG. 4.

The present invention monitors signals from two or more area-sensors, where each area-sensor covers a substantially discrete area, to determine the location of objects. The present invention, in contrast to other systems of the prior art, extracts vectorial information, rather than destroying or ignoring such information in providing a scalar resultant as taught by the prior art.

BRIEF DESCRIPTION OF THE DRAWINGS

FIG. 1—U.S. Pat. No. 4,745,284 showing destruction of vectorial information, teaching against the present invention.

FIG. 2—U.S. Pat. No. 7,183,912 showing destruction of vectorial information, teaching against the present invention.

FIG. 3—U.S. Pat. No. 6,215,399 showing destruction of vectorial information, teaching against the present invention.

FIG. 4 is a schematic view of the basic area-sensor as defined in this document

DETAILED DESCRIPTION OF THE INVENTION

Unless otherwise specified, technical terms here take their usual meanings, specifically those specified in the McGraw-Hill Dictionary of Scientific and Technical Terms, $6^{th}$ edition.

The terms area-sensor and energy detector are specifically defined in accordance with the following disclosure.

Energy detector: any device which generates or modifies an electrical signal in response to varying amounts of energy impinging upon it.

Area-sensor: an arrangement of an energy detector and at least one aperture whereby said energy detector generates or modifies an electrical signal in response to varying amounts of energy arriving from a substantially discrete area of space. The aperture may be of the physical type, comprising a barrier containing an opening, or synthetic, comprising signals processing methods. FIG. 4 shows the basic area-sensor as used throughout this document. Energy A passes through some aperture B in a housing or other opaque barrier C to strike detecting element D which, as a result of this energy, emits or modifies an electrical signal appearing across electrical conductors at E. Meanwhile energy X and X' does not affect signal E due to being blocked by barrier C. Thus this area-sensor only senses energy arriving from a specific area, F. Whenever an electrical signal is generated or modified in response to varying amounts of energy impinging upon an energy detector from a substantially discrete area of space, an area-sensor exists. Thus two or more area-sensors may have but one energy detector shared among them in the case where multiple apertures cause electrical signals to be generated or modified in response to energy from substantially discrete areas of space, as depicted in FIG. 5; or two or more area-sensors may have but one aperture shared among them in the case where multiple energy-detectors cause electrical signals to be generated or modified in response to energy from substantially discrete areas of space, as depicted in FIG. 6.

Apparatus

Figure 5:
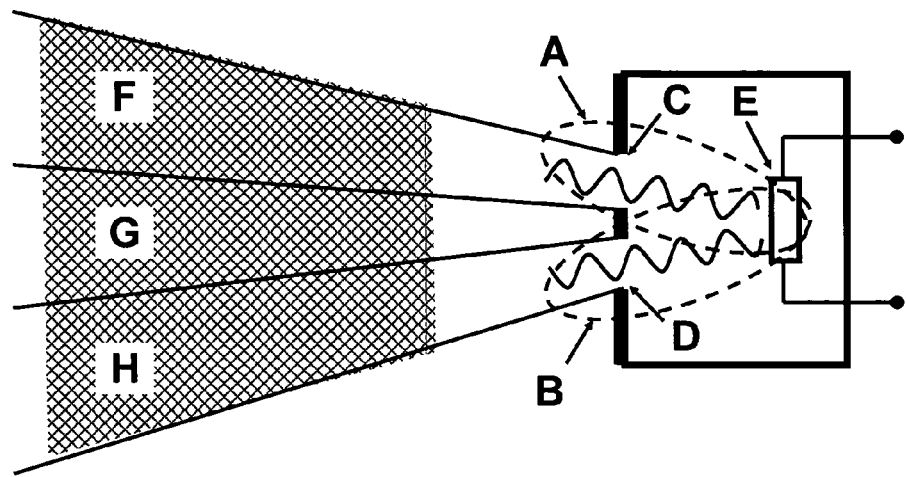
FIG. 5 is a schematic view of a first embodiment comprising two area-sensors sharing a common energy-detector element and having at least two apertures.

FIG. 5 shows a first embodiment wherein two area-sensors share a common energy-detector. Area-sensor A, sensitive to energy arriving from area F, comprises aperture C and energy-detector E. Area-sensor B, sensitive to energy arriving from area H, comprises aperture D and energy-detector E.

Figure 6:
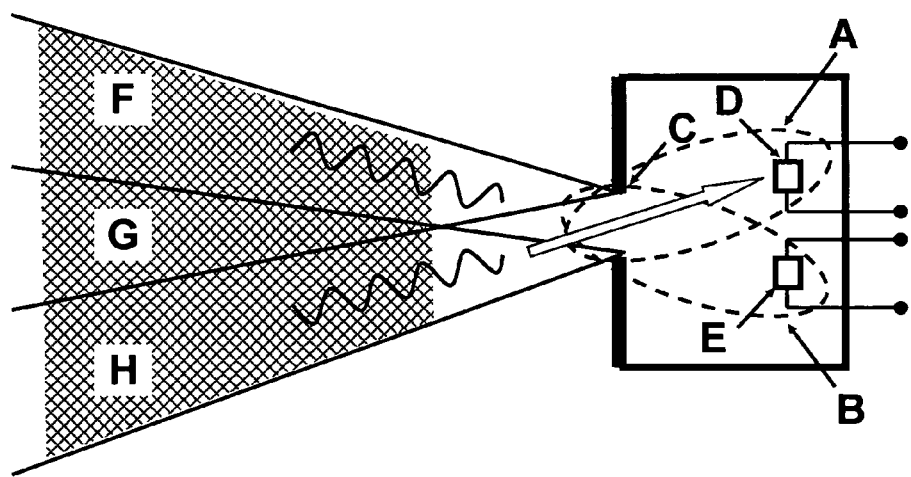
FIG. 6 is a schematic view of an alternate embodiment comprising two area-sensors sharing a common aperture and having at least two energy-detector elements

FIG. 6 shows an alternate embodiment wherein two area-sensors share a common aperture. Area-sensor A, which is sensitive to energy arriving from area H, comprises aperture C and energy-detector D. Area-sensor B, sensitive to energy arriving from area F, comprises aperture C and energy-detector E.

Figure 7:
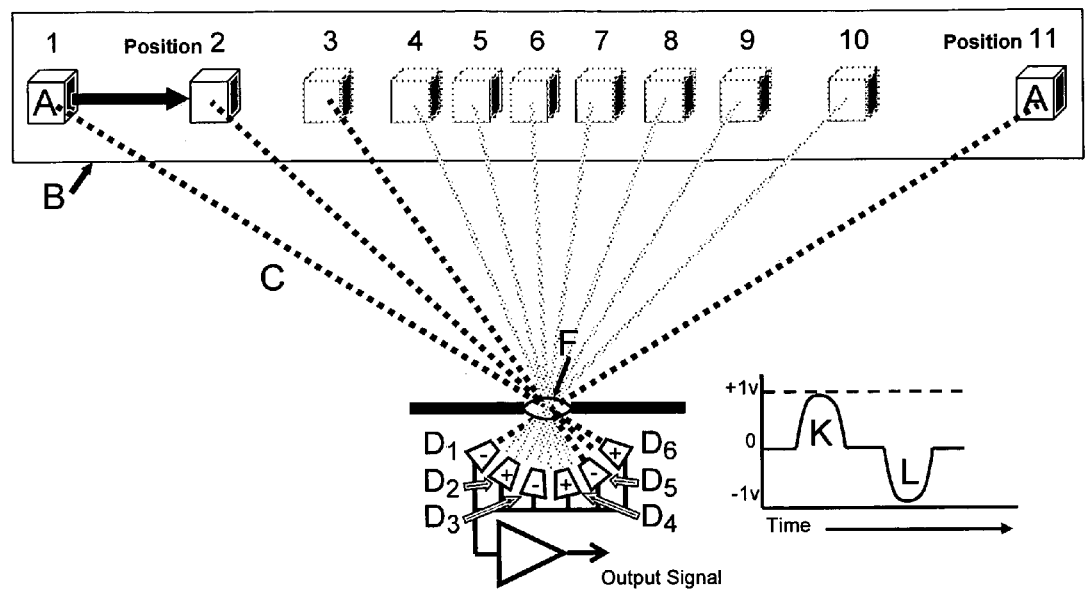
FIG. 7 is a schematic top view of an alternate embodiment of the motion detection and locating apparatus employing one aperture and multiple energy-detectors being used to detect the location of a moving object along a single axis.

FIG. 7 shows an alternate embodiment of a motion detection and locating apparatus having a plurality of area-sensors resulting from one aperture and multiple energy-detectors, each combination of an aperture and energy-detector being termed an "area-sensor." Energy-detectors (D1) through (D6) are electrically connected such that each energy-detector produces a signal opposite in polarity to that of the immediately physically adjacent energy-detectors. An object (A) enters detection area B from position 1 and passes sequentially through positions 1-11. Object A emits or reflects electromagnetic radiation (C), which passes through aperture (F). When object A is in position 1, electromagnetic radiation (C) stimulates energy-detector (D6), a positive polarity energy-detector, and thereby generates a positive-going signal (K).

Electromagnetic radiation (C) reflected or radiated from object (A) will induce a signal (taken notionally as a ±1 volt, depending on whether the energy strikes an energy-detector wired in the positive or negative polarity, while the absence of detected electromagnetic radiation is taken notionally to yield a 0 volt signal).

For clarity, FIG. 7 shows gaps in the area covered by adjacent area-sensors, such that no signal results when the object is in the even-numbered positions. Those skilled in the art will recognize that including such gaps is not critical, and that in certain embodiments the apparatus could have substantial overlaps in the coverage provided by adjacent area-sensors. Similarly, the embodiment depicted in FIG. 7 notionally yields signals of ±1 and 0 V, but there is nothing critical about the voltages chosen in a given embodiment.

Figure 8:
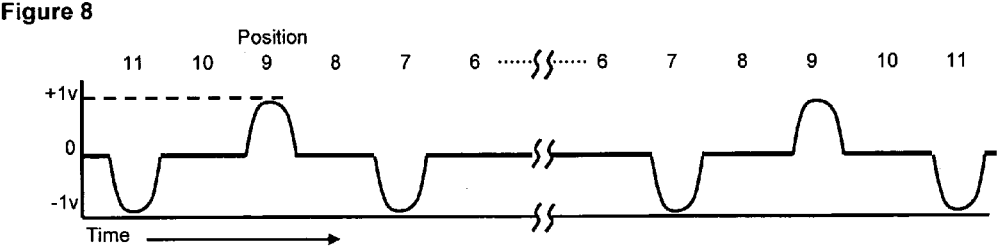
FIG. 8 shows schematic waveforms of an exemplary signal from the apparatus FIG. 7 on the entry from an object from the right, followed by exit to the right.

FIG. 8 schematically shows the signal train induced by object A on entering from position 11 in FIG. 7, proceeding to position 6, pausing, then leaving via position 11. Object A moving from position 11 to position 6 will yield the following series of signals: (−1 V) (0V) (+1 V) (0V) (−1 V) (0V). Then motion of object (A) from position 6 to position 11 would yield the following series of signals: (−1V) (0V) (+1V) (0V) (−1V).

Figure 9:
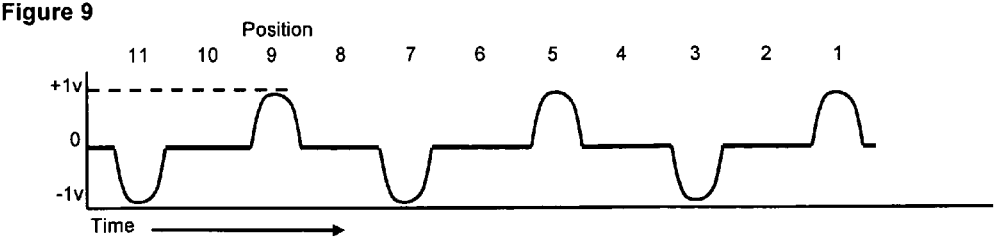
FIG. 9 shows schematic waveforms of an exemplary signal from the apparatus of FIG. 7 on the entry from an object from the right, followed by exit to the left.

FIG. 9 schematically depicts the signal train induced by object A on entering from position 11 in FIG. 7 and proceeding across detection area B to leave via position 1. Object A moving from position 11 to position 1 will yield the following series of signals: (−1V) (0V) (+1V) (0V) (−1V) (0V) (+1V) (0V) (−1V) (0V) (+1V).

Figure 10:
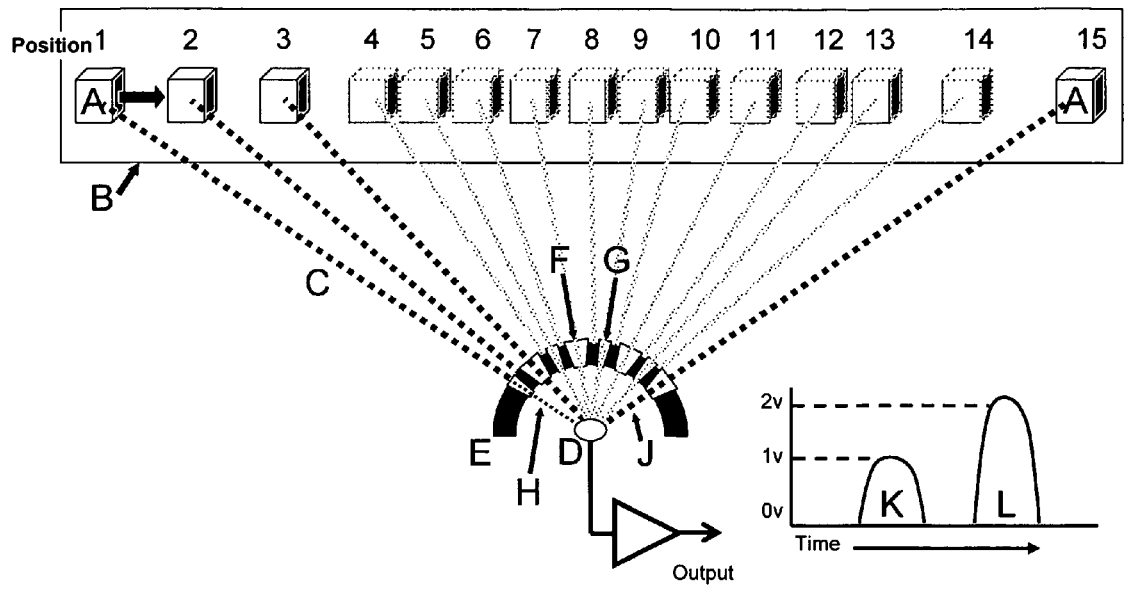
FIG. 10 is a schematic top view of an alternate embodiment of the motion detection and locating apparatus employing multiple apertures and one energy-detector being used to detect the location of a moving object along a single axis.

FIG. 10 shows an alternate embodiment of a motion detection and locating apparatus having a plurality of area-sensors comprising multiple apertures and one energy-detector, where again each aperture and energy-detector combination is termed an "area-sensor." An object (A) enters detection area (B) from position 1 and passes sequentially through positions 1-15. Object (A) emits or reflects electromagnetic radiation (C) that is incident on mask (E), which contains a plurality of apertures. In the depicted embodiment, larger apertures (F) allow more energy to impinge upon the energy-detector (D) than smaller apertures (G), and therefore allow a greater (J) or lesser (H) amount of electromagnetic radiation to impinge on detector (D), producing electrical signals of correspondingly different voltages.

In position 1, electromagnetic radiation (C) from object (A) incident upon mask (E) passes through a small aperture to impinge on detector (D), and thereby generate a smaller signal (K) (here notionally taken to be +1 V). In position 2 electromagnetic radiation (C) from object (A) is blocked by mask (E), yielding a 0 V signal. Further motion of object (A) to position 3 allows electromagnetic radiation (C) to pass through a large aperture and impinge on detector (D), to yield a larger signal (L) (here taken to be +2 V).

Figure 11:
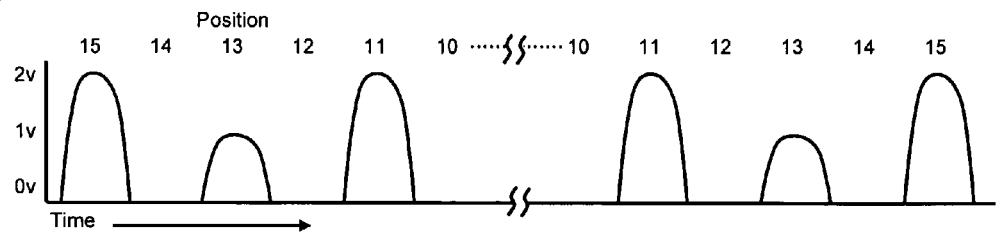
FIG. 11 depicts exemplary waveforms output from the apparatus of FIG. 10 on the entry from an object from the right, followed by exit to the right.

FIG. 11 schematically depicts a signal train from the apparatus of FIG. 10 where object A enters from position 15, moves to position 10, pauses, then leaves again via position 15. Object A entering at position 15 and moving to position 10 would yield the following series of signals: (+2V) (0V) (+1V) (0V) (+2V). Object A leaving position 10 and exiting via position 15 would yield the following series of signals: (+2V) (0V) (+1V) (0V) (+2V).

Figure 12:
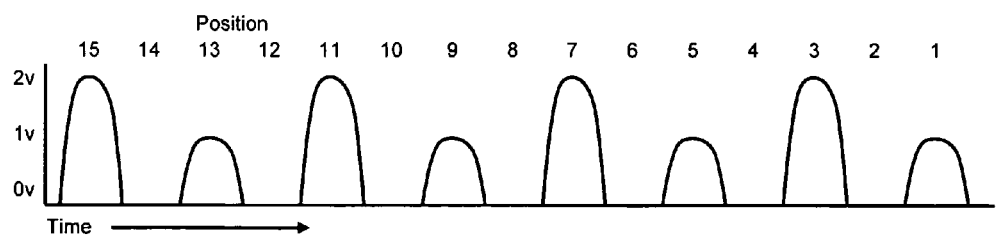
FIG. 12 depicts exemplary waveforms output from the apparatus of FIG. 10 on the entry from an object from the right, followed by exit to the left.

FIG. 12 schematically depicts a signal train from the apparatus of FIG. 10 where object A enters from position 15, and traverses detection area B, sequentially entering and leaving positions 1-15 in reverse order. Object A moving from position 15 through position 1 would yield the following series of signals: (+2V) (0V) (+1V) (0V) (+2V) (0V) (+1V) (0V) (+2V) (0V) (+1V) (0V) (+2V) (0V) (+1V).

In each case above, voltages are accorded numerical values solely for illustrative purposes, and it is clear that the numerical values of voltages are not critical to the operation of the inventive apparatus. In another embodiment, the currents or resistances at the sensors are measured instead of voltages.

Figure 13:
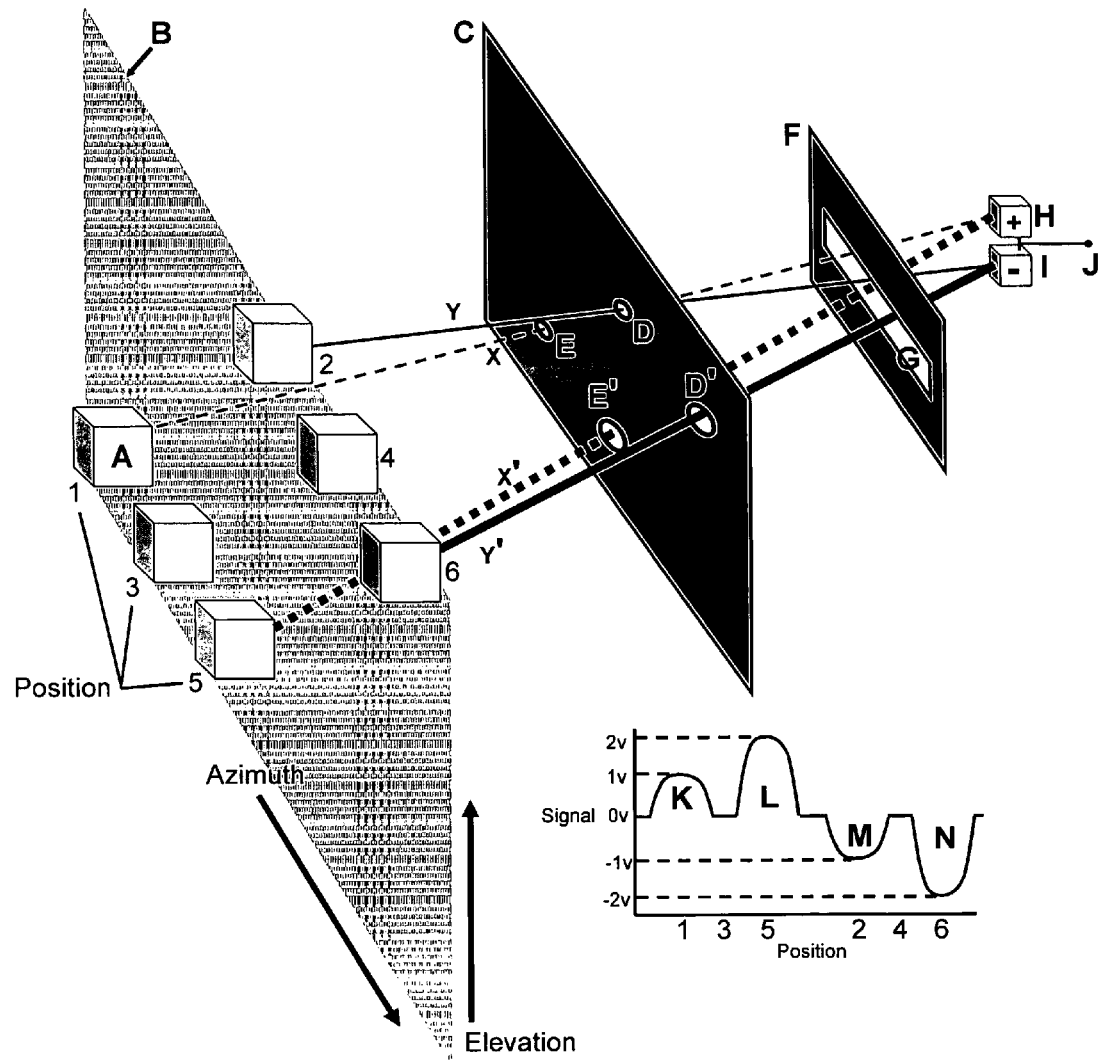
FIG. 13 is a schematic perspective view of an alternate embodiment of a motion detection and locating apparatus employing multiple apertures and two energy-detectors of opposite polarity, being used to detect the location of a moving object in two axes, localizing the azimuth and the elevation of the object.

FIG. 13 shows an alternate embodiment of a motion detection and locating apparatus having a plurality of area-sensors comprising multiple apertures and two energy-detectors, where again each distinct combination of apertures and energy-detectors is termed an "area-sensor." In one example where an object (A), at a low elevation, enters detection area (B), a two-dimensional plane, at position 1 and passes sequentially through positions 1, 3, and 5: Object (A), at position 1 emits or reflects energy (X) that is incident on masks (C) and (F), containing a plurality of apertures. Aperture (E), a small aperture within mask (C), allows a small amount of energy (X) to pass through aperture (G) to impinge upon energy detector (H) which generates a correspondingly small positive voltage signal (K). The vertical positioning of aperture (G) within mask (F) will prevent this energy from impinging upon energy detector (I). If the object (A) moves to position 3, the energy has no path to either detector (H) nor detector (I), and therefore the signal developed at output (J) is nominally (0V). Object (A) at position 5 emits or reflects energy (X') that is incident on masks (C) and (F), containing a plurality of apertures. Aperture (E'), a large aperture within mask (C), allows a large amount of energy (X') to pass through aperture (G) to impinge upon energy detector (H) which generates a correspondingly large positive voltage signal (L).

In another example where an object (A), at a high elevation, enters detection area (B), a two-dimensional plane, at position 2 and passes sequentially through positions 2, 4, and 6: Object (A), at position 2 emits or reflects energy (Y) that is incident on masks (C) and (F), containing a plurality of apertures. Aperture (D), a small aperture within mask (C), allows a small amount of energy (Y) to pass through aperture (G) to impinge upon energy detector (I) which generates a correspondingly small negative voltage signal (M). The vertical positioning of aperture (G) within mask (F) will prevent this energy from impinging upon energy detector (H). If the object (A) moves to position 4, the energy has no path to either detector (H) nor detector (I), and therefore the signal developed at output (J) is nominally (0V). Object (A) at position 6 emits or reflects energy (Y') that is incident on masks (C) and (F), containing a plurality of apertures. Aperture (D'), a large aperture within mask (C), allows a large amount of energy (Y') to pass through aperture (G) to impinge upon energy detector (I) which generates a correspondingly large negative voltage signal (N).

In this manner, a single electrical signal developed at (J) contains information revealing both an object's horizontal position and an object's vertical position with relation to the apparatus of the present invention. Increasing the number of apertures or increasing the number of sensors or both, will result in a concomitant increase in resolution of an object's position. The relative positioning of the apertures depicted in the embodiment depicted in FIG. 13 is not required for a successful embodiment of the present invention but were only chosen for illustrative purposes. Similarly, the embodiment depicted in FIG. 13 notionally yields signals of ±1, ±2 and 0 V, but there is clearly nothing critical about the voltages chosen in a given embodiment. There is likewise nothing critical about the use of apertures of varying size to cause a difference in signals relating to an object's azimuth and the use of energy detectors of differing polarities to cause a difference in signals relating to an object's elevation as depicted in FIG. 13, any technique which causes signals to vary with azimuth and to vary with elevation will suffice for the apparatus of the present invention.

Figure 14:
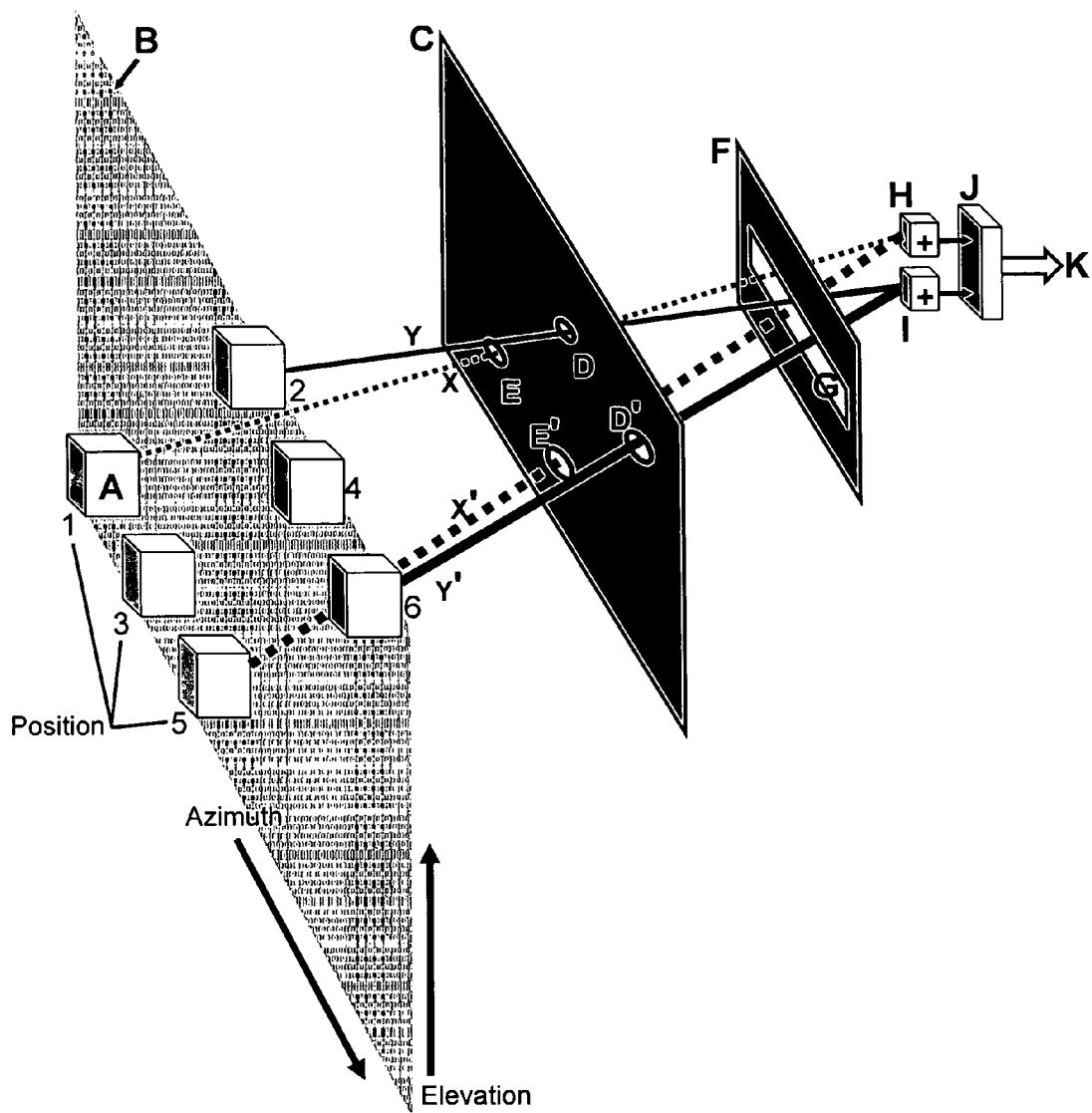
FIG. 14 is a schematic perspective view of an alternate embodiment of a motion detection and locating apparatus employing multiple apertures and two energy-detectors of the same polarity plus a decoder circuit, being used to detect the location of a moving object in two axes, localizing the azimuth and the elevation of the object.

FIG. 14 shows an alternate embodiment of a motion detection and locating apparatus having a plurality of area-sensors comprising multiple apertures and two energy-detectors, where again each distinct combination of apertures and energy-detectors is termed an "area-sensor." The description of this embodiment is the same as that for the embodiment depicted in FIG. 13 above, except that resolving the object's elevation is no longer dependent upon the polarity of the signal. Instead, energy detector (H) and energy detector (I) independently output similar signals to decoding circuit (J) which in turn determines the azimuth of the object by the amplitude of the signals, and the elevation of the object by whether the signal is arriving from energy detector (H) or energy detector (I). Decoding circuit (J) then outputs position signal (K), which may be of any type required, according to the requirements of the application of the present invention. Examples of suitable signals (K) may include, but are not limited to the following signal types: serial data, parallel data, motor control signals, analog voltages or currents representing the position of the detected object.

Other embodiments may include techniques resulting in more than two voltage levels, and/or a modulated signal through the use of electrically-modifiable filters or polarizers. In addition those skilled in the art will recognize that more sophisticated techniques will lead to resolving the location of more than one object simultaneously, and/or identifying particular objects by some characteristic of their reflected or radiated energy. Those skilled in the art will recognize the utility in the timing or 'width' of each signal and the period between signals within a signal train, combined with predictive circuitry and/or algorithms within the code of a microprocessor, which methods can be used to enhance the ability to determine, for example, the character of the object's motion, acceleration and deceleration or the object's velocity.

As can be readily seen, there is nothing special in the number of apertures or energy detectors employed in any given embodiment of the present invention. For example, an array of sixteen area-sensors, arranged in four columns of four area-sensors each, of the type depicted in FIG. 14 could be used to detect the motion and location of an object in two axes. In such an embodiment, a position decoding circuit similar to element (J) of FIG. 14 but having sixteen inputs might be used.

Each area-sensor in the apparatus comprises an energy-detector and an aperture. Energy-detectors are chosen to respond to the energy of interest (usually electromagnetic radiation), such as radio waves, microwaves, infrared, visible, ultraviolet, X-rays, and gamma rays, as is well-known in the art. For example, suitable detectors for visible and infrared radiation include photocells, such as photovoltaic, photogalvanic, photodiode, phototransistor, and photoresistive devices. In other embodiments energy detectors may respond to acoustic energy.

A preferred embodiment of the present invention detects infrared radiation. Use of the present invention for other regimes of the electromagnetic spectrum or for other types of energy such as acoustic, will be readily appreciated by those of skill in the art. Well-known methods of selecting desired wavelengths of electromagnetic radiation, such as filters, monochromators, polarizers, or diffraction gratings can optionally be used to restrict the type of the energy to which the sensors respond.

An aperture is used to define the solid angle from which a signal can gain access to a given energy-detector. An aperture is used here to restrict energy incident upon a detector to a defined solid angle. Apertures can also take the form of lenses or employ lenses. Apertures are so placed with respect to energy-detectors that the solid angles covered by any energy-detector-aperture pair, defining an area-sensor, are at least partially distinct. Apertures can also optionally include lenses, such as convex or preferably Fresnel lenses, to focus incident radiation on a given area or modify the solid angle being monitored, or polarizing or color filters, to restrict the polarization or wavelength of radiation incident upon a detector. Apertures can also contain devices which modify the energy passing through them in such a manner as to render their respective energy detector signals distinct from that of other apertures in an embodiment e.g. each aperture having an electrically activated polarizing filter activated in a distinct pattern or sequence causing the electrical signal from its associated energy detector to also exhibit this distinct pattern or sequence, thus rendering said signal distinct from signals of the other aperture-energy detector pairs.

Those skilled in the art will also see that it is the variation in energy being detected that is required by the present invention so that a diminution of energy may be as effective as an increase of energy in determining the presence and position of an object e.g. cool objects moving in front of a warm background, black boxes moving in front of a white background, green objects moving in front of a red background.

A physical aperture presupposes the existence of a mask, which blocks the transmission of the type of incoming signals being detected from impinging upon the energy-detector. Masks can be composed of any material suitable for inhibiting the transmission of the type of incoming signals being detected. For example, masks for visible or near infrared light may be constructed of any material that substantially impedes the transmission of such light, such as an opaque or translucent material.

In one embodiment, as depicted in FIG. 10, a given energy-detector is associated with a plurality of apertures, such that an object passing through the solid angle defined by the apertures collectively, generates a train of signals, as depicted in FIG. 11 and FIG. 12, as radiation traversing successive apertures in turn impinges on the energy-detector. In another embodiment, as depicted in FIG. 7, a given aperture is associated with a plurality of energy-detectors, such that an object passing through the solid angle defined by the aperture and the energy-detectors generates a train of signals, as depicted in FIG. 8 and FIG. 9, as radiation traversing the aperture impinges on each energy-detector in turn.

In either embodiment the motion detecting and locating apparatus and method, by enumerating each signal in a train of signals and classifying each signal by some characteristic such as polarity, voltage, position within the train of signals, or other characteristic so as to differentiate each signal from the others within the train of signals, is able to discern the position of the object.

Those skilled in the art will readily appreciate how to increase spatial resolution of the apparatus by increasing the number of area-sensors, apertures, and/or detectors, as desired.

The present invention can be used to control devices, such as to move or redirect a device to track objects, as will be readily appreciated by those of skill in the art. For example, signals from a motion detector according to the present invention may be used to control such devices as camera shutters, lighting controls, recording device controls, and pan-tilt-zoom cameras and camera platforms.

Signals may be converted from analog type to digital (numerical) values, allowing them to be processed by a microprocessor; which in turn communicates the calculated positions of objects to other devices, not part of the present invention. For example, where the position of the object causes one or more motors to move a platform causing the orientation of said platform to either follow moving objects or avoid moving objects. Such a platform might support an electronic camera or a directional lighting system.

Additionally, signals conveying the position of objects may be used to modify the space being monitored by the present invention itself, by means of moving mirrors, apertures, energy detectors, or causing a motor or solenoid or similar device to change the angle or position of an embodiment of the present invention, such that the present invention 'views' a different area of space in response to the motion of one or more objects being monitored.

In those embodiments where a suitable arrangement of area-sensors allows for employment of triangulation methods, distance to objects can be determined, which might be used to establish the focal length of imaging systems or to focus a camera, or other uses.

When the present invention is used in a lighting, alarm or other such system where it is desirable to remove the activation signal upon removal of the detected object from the monitored area; prior art used a fixed time-interval, which often erred by removing the signal which indicated the presence of an intruder or other object of interest, even though the object was still within the monitored area. The present invention remedies this problem in that the position of the object can be used as a qualifying datum in determining whether or not the activation signal should be removed; e.g. turning off the lighting.

In some applications the direction of travel of the object may be of prime concern, e.g. allowing people to enter a room through a hallway or doorway, but causing an alarm if they attempt to leave, such as might be used in collecting tolls or at an airport security station. Another application where determining the direction and position of an object might be to provide a small and cheap ersatz turnstile for counting the number of customers approaching and leaving through a doorway, or approaching and leaving a sales counter, etc.

Method

By supplying at least two area-sensors which respond to energy arriving from substantially distinct areas of space, circuitry which measures some characteristic (e.g. timing, width, polarity, amplitude, modulated frequency) of the area-sensor electrical signals can derive the relative position of objects by correlating said characteristic to the known geometric arrangement of the area-sensors and the distinct regions of space which they monitor.

For example, in the simple case where several area sensors, in sequence, cover a linear region of space; an object transiting such a linear region might cause a train of pulses to be generated. The circuitry of the present invention, by 'counting' the pulses, would be able to determine that upon occurrence of the first pulse, the moving object has just entered the aforesaid linear region. Knowing the geometric relationship between the energy detectors and the apertures, this establishes the relative angle of the object at the time of the pulse. Further pulses indicate further travel along the linear region.

If the signal generated by the area-sensor covering one end of the linear region is made to be distinct from the signal of the opposite end of the linear region, e.g. opposite polarity, different frequency of modulation, larger amplitude; the circuitry, e.g. microprocessor or inexpensive analog circuitry, is able to determine at which 'end' of the linear region the object first entered.

This method may be expanded to include embodiments where each and every area-sensor generates signals unique from all the others within the embodiment removing any possible ambiguities as to the objects current position. By providing additional area-sensors one is able to derive the position of an object in more than one axis which enables determining the position of objects in azimuth, elevation, and distance.

Although the present invention has been described with reference to certain preferred versions and applications, other versions and applications are possible. Therefore, the spirit and scope of the appended claims should not be limited to the description of the preferred versions contained herein.

The invention claimed is:

1. An object locating apparatus for signaling to a user the continuous existence of an object within a designated area that is defined by the apparatus, the apparatus configured to detect energy from the object, the apparatus comprising:
   at least two apertures configured to permit a controlled amount of energy therethrough and into an energy detector housing; and
   at least one energy detector within the energy detector housing configured to detect at least some of the energy coming through the apertures and to generate a signal that translates the detected energy into information about the location of the object within the designated area, the information comprising at least two aspects: (a) whether an object has entered or left the designated area, and (b) the moment to moment position of the object within the designated area relative to the apparatus,
   where the apparatus is configured so that the signal information comprising the relative position of the object is used to direct a device communicatively linked to the apparatus, and
   wherein the designated area is defined by the volume of space from which energy from the object can penetrate the apertures and still reach the energy detector, so that energy radiated from without the designated area has no impact on the signal generated by the energy detector.

2. The object locating apparatus of claim 1, further comprising a plurality of energy detectors configured to detect energy coming through the aperture, wherein the energy detectors generate a signal that translates detected energy into information about the location of the object within the designated area.

3. The object locating apparatus of claim 1, wherein the energy radiated through the apertures is controlled by the aperture's shape and size.

4. The object locating apparatus of claim 3, further comprising aperture modulation means for modulating the shape and/or size of the apertures, to vary the amount of energy permitted therethrough from an object within the designated area.

5. An object locating apparatus for signaling to a user the continuous existence of an object within a designated area that is defined by the apparatus, the apparatus configured to detect energy from the object, the apparatus comprising:
   at least one aperture configured to permit a controlled amount of energy therethrough and into an energy detector housing; and
   at least two energy detectors within the energy detector housing configured to detect at least some of the energy coming through the aperture and to generate a signal that translates the detected energy into information about the location of the object within the designated area, the information comprising at least two aspects: (a) whether an object has entered or left the designated area, and (b) the moment to moment position of the object within the designated area relative to the apparatus,
   where the apparatus is configured so that the signal information comprising the relative position of the object is used to direct a device communicatively linked to the apparatus, and
   wherein the designated area is defined by the volume of space from which energy from the object can penetrate the apertures and still reach the energy detector, so that energy radiated from without the designated area has no impact on the signal generated by the energy detector.

6. The object locating apparatus of claim 5, comprising a plurality of apertures configured to permit a controlled amount of energy therethrough, the plurality of apertures positioned and configured to permit the energy detectors to detect energy coming through the plurality of apertures.

7. The object locating apparatus of claim 5, wherein the energy radiated through each aperture is controlled by the aperture's shape and size so that the resultant signals generated at each detector are made unique with respect to other detectors within the same apparatus.

8. The object locating apparatus of claim 7, further comprising aperture modulation means for modulating the shape and/or size of the apertures, to vary the amount of energy permitted therethrough from an object within the designated area so that the resultant signals generated at each detector are made unique with respect to other detectors within the same apparatus.

* * * * *